April 28, 1936. J. F. REIF 2,039,115
DUST COLLECTOR
Filed Oct. 17, 1932
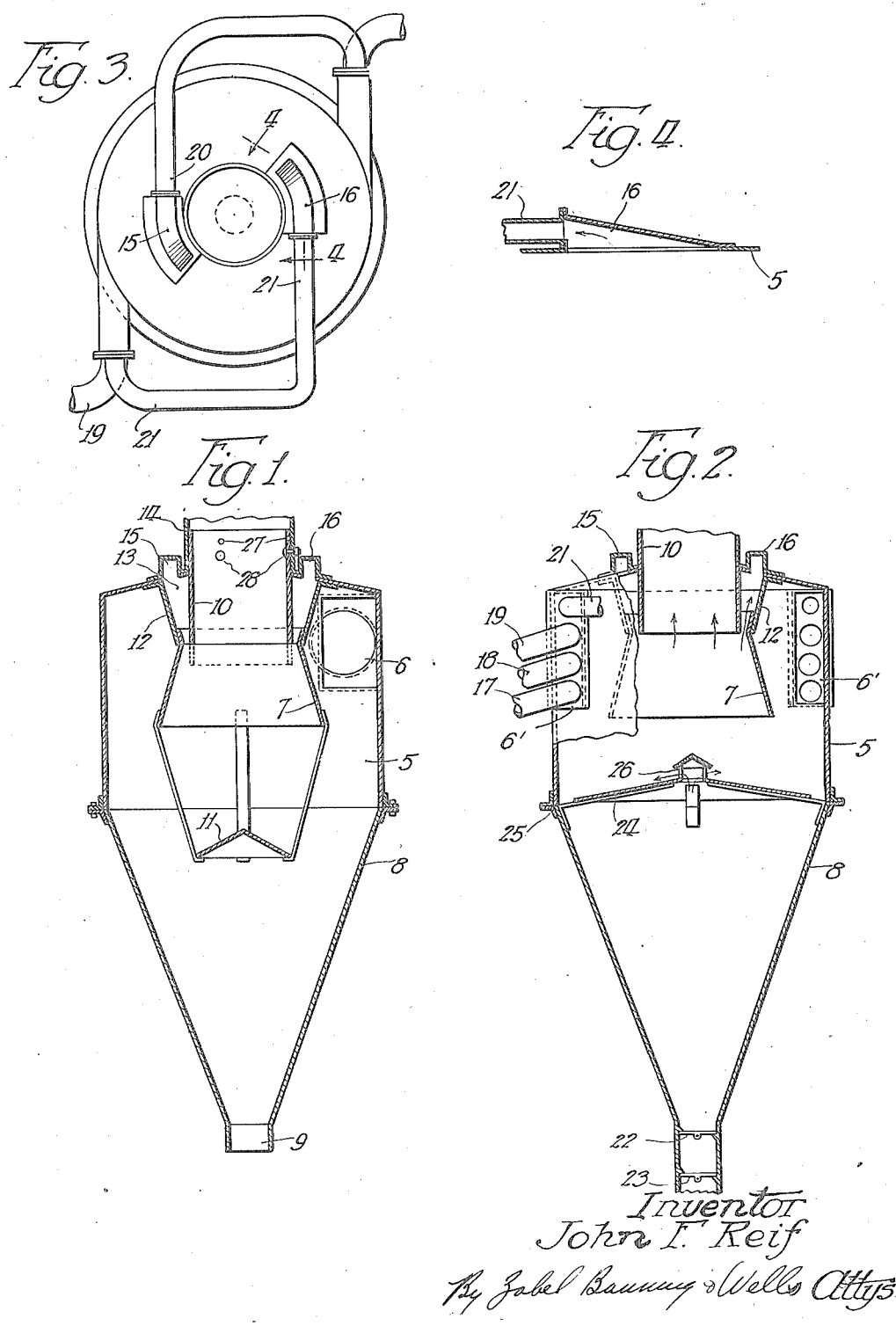
Inventor
John F. Reif
By Zabel Baumig & Wells Attys.

Patented Apr. 28, 1936

2,039,115

UNITED STATES PATENT OFFICE 2,039,115

DUST COLLECTOR

John F. Reif, Chicago, Ill.

Application October 17, 1932, Serial No. 638,055

2 Claims. (Cl. 183—39)

My invention relates to dust collectors or traps and particularly to that type of collector wherein the air from which the dust is being collected is caused to rotate so as to force the heavy dust particles to the outside of the dust chamber.

It is the principal purpose of my invention to provide a novel means of removing a considerable portion of that fine dust which is not taken out directly by the centrifugal motion in the rotation of the air in the dust chamber.

More specifically, it is a purpose of my invention to provide in a dust collector of the character described a dust gateway cooperating with the air vent from the collection chamber to concentrate and remove a certain amount of dust which would normally find its way up the air vent.

It is also a feature of my invention to provide a dust gateway in conjunction with the tubular air vent which includes a guiding member interposed between the inlet to the dust chamber and the air vent which guiding member also functions to force the incoming dust laden air downwardly and outwardly.

I will describe the preferred form of my invention by reference to the accompanying drawing wherein—

Fig. 1 is a vertical section through a dust collector of the pressure type;

Fig. 2 is a similar section through a dust collector of the type wherein a suction fan is employed in the line leading from the tubular air vent as contrasted with the pressure type shown in Fig. 1 where air is forced into the collector under a pressure;

Fig. 3 is a top plan view of the form shown in Fig. 2; and

Fig. 4 is a section substantially on the line 4—4 of Fig. 3.

Referring now in detail to the drawing, I will describe my invention as applied to two conventional types of centrifugal dust collectors.

The first type, as shown in Fig. 1, has the dust laden air blown into the dust chamber 5 through the tangential inlet 6 in a well known fashion. The air coming into the chamber 5 naturally whirls rapidly around within the chamber, and the heavy particles of dust will reach the outside wall of the chamber, and, as the air is forced downwardly to get around the guide member 7, this dust will settle down through the conical portion 8 of the dust chamber to the outlet 9 and this outlet may, of course, lead to any suitable dust storage or removal facilities. Usually, the dust falls from the outlet 9 into a storage room where it remains until disposed of.

Owing to the whirling motion of the air within the dust chamber 5, the tubular air vent 10 and the outlet 9 form flues through which there is a tendency for the air from the outside to enter the dust chamber along the center of the air vent and the outlet 9. I employ the usual baffle at 11 which will, if properly positioned and of the proper size, prevent this difficulty so far as the air coming upward from the outlet 9 is concerned.

All of the foregoing features are usually practiced in the art of dust collecting. I have, however, provided, by the use of the member 7 in conjunction with the air vent 10 and the portion 12 which is in reality a part of the member 7, a new feature which is of vital importance in dust collecting. Most machines of the centrifugal type will take out, if properly constructed, the greater portion of the dust in the air passed through them. The difficulty, however, is to remove any part of the last amount of fine dust remaining in the air. This amount may vary up to ten or fifteen per cent of the total dust, and, being usually the finest dust, it is also the most difficult to handle at all times.

The function of the gateway provided by the guide member composed of the two conical sections 7 and 12 and the air vent 10 is really a dual one. In the first place, the air coming in through the inlet finds the outer surface of the guide member interposed in its path so as to cause the air to stay out near the outer wall of the dust collector, and the outwardly flaring lower portion 7 of the guide member causes the air and the dust therein to move gradually outward and downward in the dust chamber. This imparts a better whirling motion to the air and, in this fashion, facilitates the removal of the dust at the beginning of the operation. The air, however, must escape so it moves upwardly after having passed below the lower edge of 7, and, as the air is still whirling with very little air at the center, the air and fine dust carried upward with it ride along the inner surface of the member 7 being gradually narrowed in the circumference of its whirling.

The effect of this action is to concentrate the dust in the air along the edge of the member 7, and, when the lower edge of the member 10 is reached, this concentrated dust and air passes upwardly into the expanding chamber 13 while the remainder of the air nearer the center continues to whirl upward through the air vent 10 and may escape to atmosphere or some other place through the outlet pipe 14. The concentrated air and dust in the expanding chamber 13 is removed through the outlets such as 15 and 16; and, if desired, it may be returned to the fan driving the dust into the inlet 6 so as to again pass through the machine.

In the suction type of collector shown in Fig. 2, the structure of the dust chamber 5, conical portion 8, air vent 10, guide members 7 and 12 forming the dust gateway, outlets 15 and 16 are substantially the same as in Fig. 1. In this type of machine, however, dust is usually collected from a number of sources so I have shown the tangential inlets 6' as located one on each side in contrast to the one inlet 6 of Fig. 1. A plurality of supply pipes or feeders such as 17, 18, and 19 may lead into these tangential air inlets. The outlets 15 and 16 are also connected by the pipes 20 and 21 back to the inlets 6' so as to return the concentrated dust and air removed by means of the gateway to the dust chamber again.

The suction type of machine operating with a pressure within the chamber 5 of less than atmosphere must naturally be closed at the bottom in order to prevent air from rushing upwardly and causing a break-up of the whirling motion within the chamber which would result in a substantial loss of the dust collected. To be sure that the chamber 5 is always closed, I provide a pair of traps or cut-offs 22 and 23 at the bottom of the portion 8 of the dust chamber.

Since the lower conical portion 8 in this device is essentially a settling chamber where dust collects and is then discharged through the outlets, it is essential that as little air circulation as possible shall take place in this lower part. For this reason, I use the wide baffle or separator dome 24, and the same may be suspended, as shown, from the member 8 or otherwise supported, this dome serving to provide a narrow passageway at 25 through which the dust will settle down into the chamber formed by the conical portion 8. The vent at 26 permits what little air is carried down by the dust to return to the upper portion of the dust chamber without creating a disturbance in the lower or settling part.

The function and operation of the members 7 and 12 is in general substantially the same as in Fig. 1. That is, the dust laden air enters through any of the pipes 17 or 18 or 19, is caused to circulate or whirl around within the dust chamber, and is directed downwardly and outwardly by the outer surface of the member 7. The inner surface of the member 7 then functions as before described to concentrate the fine dust as the air whirls upwardly toward the air vent and to remove this dust into the chamber 13 substantially in the same fashion as in Fig. 1.

In some cases where the dust is of a sticky or clogging type, it is possible to encounter difficulty in getting out the dust passing through the gateway between the vent 10 and the guide member made up of the portions 7 and 12. I preferably mount the vent 10 so it can be adjusted up and down. This is done in Fig. 1 by means of openings 27 and bolts 28.

Extending the vent more or less below the smallest diameter of the guide member increases or decreases the amount of air and dust taken off by the gateway.

The above description, it is believed, will enable those skilled in this art to fully understand the present invention and the advantages thereof. It is also believed to be obvious that various modifications may be made from the exact details of the structure shown and described without departing from the scope of the invention.

Having thus described my invention, what I claim as new and desire to secure by United States Letters Patent is:

1. A dust collector comprising a casing having a cylindrical upper portion provided with a tangential inlet near the top thereof and provided with a closed top having a central opening, a tubular vent member extending down into said casing from said opening, a second tubular member extending from the top of the casing down around said vent member and below the lower end of said vent member, said second tubular member increasing in diameter upwardly and downwardly from a point adjacent the lower end of the vent member, said casing having an outlet opening through the top thereof between the junction of the vent member with the top and the junction of the second tubular member with the top.

2. A dust collector comprising a casing having a cylindrical upper portion provided with a tangential inlet near the top thereof and provided with a closed top having a central opening, a tubular vent member extending down into said casing from said opening, a second tubular member extending from the top of the casing down around said vent member and below the lower end of said vent member, said second tubular member increasing in diameter upwardly and downwardly from a point adjacent the lower end of the vent member, means to return the material from the space between said tubular members directly to said inlet, said casing having a conical lower dust collecting portion, and a barrier separating the cylindrical and conical portions of the casing, said barrier sloping downwardly from the center to the rim and being slightly spaced from the casing at the rim, said barrier having a vent at the center thereof.

JOHN F. REIF.